United States Patent
Thalhammer

[11] Patent Number: 5,546,667
[45] Date of Patent: Aug. 20, 1996

[54] ADJUSTABLE CARTRIDGE CASE GAUGE

[76] Inventor: Franz Thalhammer, Wolftratshauser Str. 44, D-82065 Baierbrunn, Germany

[21] Appl. No.: 365,581

[22] Filed: Dec. 28, 1994

[30] Foreign Application Priority Data

Mar. 12, 1994 [DE] Germany .................. 9404195 U

[51] Int. Cl.⁶ .................................................. G01B 5/00
[52] U.S. Cl. ................................................ 33/506; 33/542
[58] Field of Search ................ 33/506, 562, 542, 33/827

[56] References Cited

U.S. PATENT DOCUMENTS

| | | | |
|---|---|---|---|
| 519,541 | 5/1894 | McBride | 33/827 |
| 1,351,721 | 8/1920 | Eickhoff et al. | 33/542 |
| 2,451,419 | 10/1948 | Vinyard | 33/827 |
| 2,483,089 | 9/1949 | Ferguson | 33/506 |
| 2,497,196 | 2/1950 | Woodward | 33/827 |
| 2,502,613 | 4/1950 | Zanolio | 33/506 |
| 2,544,158 | 3/1951 | Henderson | 33/506 |
| 2,553,704 | 5/1951 | Eckel | 33/506 |
| 2,665,489 | 1/1954 | Cunningham | 33/827 |
| 2,668,360 | 2/1954 | Keller | 33/562 |
| 3,510,951 | 5/1970 | Dow | 33/506 |

*Primary Examiner*—Thomas B. Will
*Attorney, Agent, or Firm*—Gifford, Krass, Groh, Sprinkle, Patmore, Anderson & Citkowski, P.C.

[57] ABSTRACT

The invention relates to an adjustable cartridge case gauge comprising a head portion adjacent to the shoulder of the case and a foot portion adjacent to the surface of the breech, the construction being such that the distance between the head portion and the foot portion are infinitely adjustable. In order to minimize the number of gauges which are necessary for several kinds of cartridge cases and thus to minimize the costs for manufacturing and storage the construction should be such that the range of adjustment between the head portion and the foot portion is so great that all cartridges having the same diameter of the rear surface of the foot portion may be adjusted, moreover that the head portion coming in contact with the shoulder of the cartridge case is hemispherically configured so that independently from the caliber of the corresponding cartridge, the angle of the shoulder and the length of the shoulder, contact of the head portion at the shoulder is ensured and the distance between the head portion and the foot portion can be fixed at each position.

4 Claims, 1 Drawing Sheet

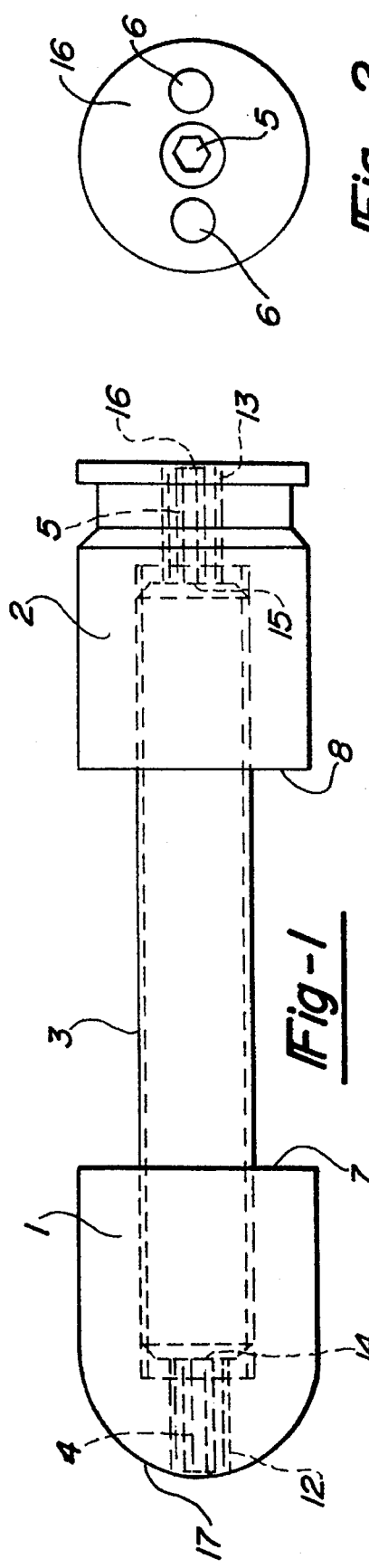
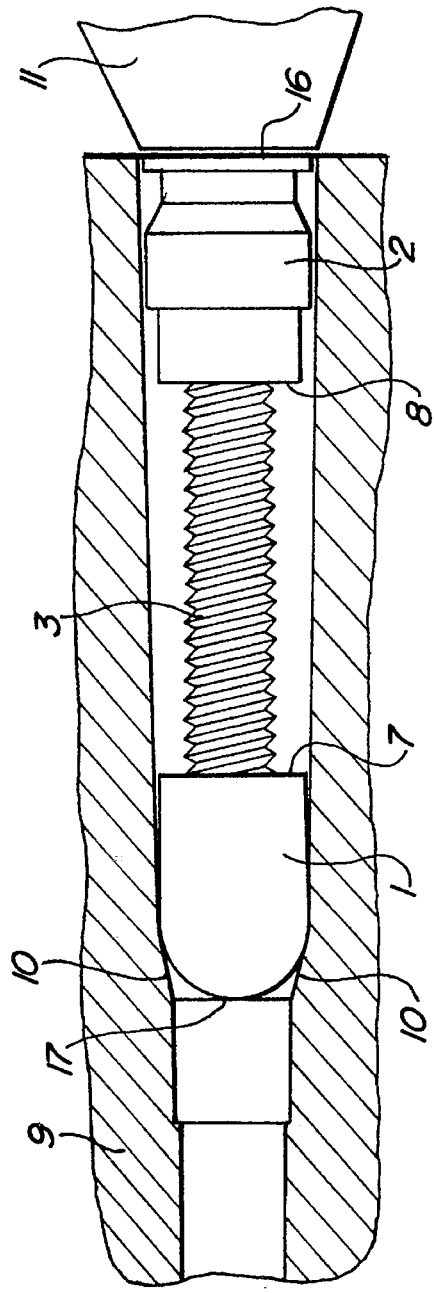

ADJUSTABLE CARTRIDGE CASE GAUGE

BACKGROUND OF THE INVENTION

The invention relates to an adjustable cartridge case gauge especially for edgeless shoulder cartridges used for firearms, comprising a head portion adjacent to said shoulder and a foot portion adjacent to the bolt of a breech mechanism, the distance between said head portion and said foot portion may be adjusted in an infinitely variable manner.

For the manufacture, the fire test and the repair of firearms cartridges, space gauging devices are necessary by which the size of the cartridge space of the corresponding gun, for instance a pistol, may be measured and by which it can be checked whether or not the prescribed size is present.

U.S. Pat. No. 2,668,360 discloses a head space gauge for firearms by which the distance for the face of the bolt of a closed breech mechanism to the shoulder in the chamber of a barrel against which cartridges are seated can be defined. Although this known gauge is also adjustable in length and moreover the adjusted position thereof will not be changed upon the closing and opening the breech mechanism, this gauge needs a considerable number of spacer shims of different thickness which are to be positioned between the surfaces of a forward and a rearward section of the gauge for changing the measurement between the gauging surfaces.

The above construction is therefore cumbersome and rather expensive to manufacture.

According to U.S. Pat. No. 3,510,951 concerning a cartridge head space gauging device for rifle firing chambers measuring the space between a tapered forward shoulder of the firing chamber and the face of a breech block or bolt of a rifle in close condition is accomplished by joining a fore or front member shaped with an outer surface configuration including a tapered forward end which dimensionally conforms to the forward end of a cartridge shell for the chamber of a rifle and a rear member provided with an end face engageable by the breech block or bolt of the rifle with outer portions forwardly thereof having outer surfaces identical with corresponding surfaces of the cartridge shell. These two members are separated by a deformable ring to define a length greater than the length of a standard cartridge shell The whole device consisting of the above two members and the ting are placed in the firing chamber and thereafter removed therefrom and placed in a suitable gauging instrument to determine the exact dimension of the firing chamber. Thus, this gauging device is also rather expensive to manufacture and to use.

U.S. Pat. No. 2,553,704 concerns a head space gauge for firearms using a telescopic means consisting of two parts indicating the exact head space when introduced in the chamber of the rifle and the bolt is closed.

Although this device is rather simple to manufacture and use it is not suited for a great number of firing chambers in general but only for special configurated firing chambers provided with tapered shoulders the slope and length thereof correspond to the configuration of a conical portion of the head of the cylindrical plug of the gauge.

Moreover, U.S. Pat. No. 3,209,461 concerning an adjustable cartridge case gauge is also providing a rather simple and inexpensive device convenient to use, it needs, however, a great number of inserts adapted to the gauge body by employing threads. This construction does therefore not fulfil the requirements concerning a very precise measurement using less as possible elements.

In case of shoulder cartridges the cone-tool-head length of the cartridge, measured between the shoulder engaged by the cartridge and the bottom of the cartridge, called breech distance, is of special importance. Normally this kind of gauges consist of one piece. Thus, for each kind of cartridge gauges for minimum and maximum dimensions are necessary resulting in high costs because of the great number of the present cartridges. Moreover, it is rather cumbersome to find out by means of the above mentioned fixed gauges the real length of the cartridge chamber if no exactly suited gauge exists for that purpose.

As mentioned above adjustable gauges have already been proposed comprising two parts moveable with respect to one another so that these two parts may be slideably engaged and connected to one another to different lengths by means of friction. Using this kind of gauges the measuring operation should be such that at first the gauge is adjusted to a size greater than the nominal size and in such a condition introduced into the cartridge chamber. Thereafter the breech is closed. At the same time the gauge is adapted to the real dimensions. After the gauge will have been taken off the cartridge chamber its length may be determined. In practise, however, this construction is not satisfying.

To summarize the above discussed prior art the devices one can say that all known gauges are in so far disadvantageous as for each kind and size of cartridge at least one special gauge must be prepared and stored what is not only expensive but also cumbersome and requests space for keeping a greater number of gauges every time available.

DESCRIPTION OF THE INVENTION

It is therefore an object of the invention to provide a gauge which is adjustable to different sizes of cartridges in order to exactly find the head space when introduced in the chamber of the rivet and the bolt is closed.

It is another object of the invention to provide an adjustable gauge by which all cartridge chambers or cases for edgeless shoulder cartridges of a definite breech bolt diameter may be gaged.

A further object of the invention is to provide an adjustable gauge by which the manufacturing costs and operation costs of the common gauges for the measurement of the firing or cartridge chambers may be extremely decreased, because the gauge according to the subject invention replaces a great number of common gauges of different sizes which have to be used for that purpose in order to define the exact dimension of the cartridge chamber.

Still further objects and features of the invention will herein after appear from the following description taking in conjunction with the accompanying drawings in which:

FIG. 1 is a schematical longitudinal section through the gauge showing the same in the chamber of a barrel with a breech mechanism in closed position thereon, FIG. 2 is a from view of the gauge at its rear end, and FIG. 3 is also a schematical longitudinal feel of the gauge within the housing of a barrel.

The adjustable cartridge case gauge according to the invention comprising a head portion 1 at its forward end and a foot portion 2 at its rear end which are connected by a threaded rod 3. By rotating the head portion or foot portion with respect to one another in and out of the threaded bore the gauge may be adjusted to a required distance or measure. After such an adjustment the two portions 1 and 2 may be fixed by fixing screws 4, 5 which are removably placed within threaded bores 12 and 13 axially located in the head portion 1 and foot portion 2, respectively. Front ends 14, 15 of these fixing screws 4, 5 are in a fixed position adjacent to the respective from side of the threaded rod 3.

Thus, after calibration of the gauge during the manufacture thereof one can read from a corresponding schedule the distance between the head portion 1 and the foot portion 2 corresponding to each measuring operation to be done. In this connection, opposing ends 7, 8 of the head portion 1 and the foot portion 2 are used as measuring surfaces using common measuring apparatus' contacting these surfaces.

In order to further explain the operation of the adjustable cartridge case gauge of the invention attention is drawn to the following example. In order to manufacture a cartridge case 9 the gauge is adjusted to the requested size of the cartridge case. Thereafter, the cartridge case will be worked by means of known tools until the required depth of the cartridge case is reached. During that operation measurements are made from time to time by inserting the gauge into the case in order to find out how far the work has been proceeded.

In order to check the size of an existing cartridge case the cartridge gauge will be adjusted such that a breech 11 may still be closed without to much forcibly pressing it against the rear end of the foot portion 2. Thereafter the distance between the head potion 1 and foot portion 2 will be measured and on the basis of the measured value the actual dimension of the cartridge case will be determined by means of the above mentioned schedule.

Especially, if edgeless cartridges are used in break-joined guns it could be advantageous to adjust the gauge even within a cartridge case. For that purpose drivers 6 as shown in FIG. 2 are provided within the bottom of the foot portion 2 of the gauge.

If the adjustable cartridge gauge is positioned in the cartridge case 9 as shown in FIG. 3, the rounded front surface 17 oft he head portion 1 contacts the shoulder 10 of the cartridge case, hemispherically whereas the fiat rear surface 16 of the foot portion 2 contacts the breech 11.

For the time being edgeless shoulder cartridges are provided with four different bottom diameters of the foot portion 2. Thus, gun cartridges are for instance provided with 7,65 mm Para, small fire arm cartridges are for instance provided with 0,17 Rem, normal cartridges are for instance provided with 8×57 IS and magnum cartridges without belt are for instance provided with 8×68 IS. For each of the above mentioned four diameters of the bottom corresponding to the fiat rear surface 16, only one adjustable gauge according to the subject invention is necessary. Because by the special configuration of the head portion 1 a reproducible contact for all shoulder configurations and calibers presently available is ensured.

We claim:

1. An adjustable cartridge case gauge for establishing a specified cartridge size within a cartridge case of a firearm, a rear of the cartridge case being closed by a breech and a front of the case being defined by inwardly angled shoulders, said gauge comprising:

a head portion positioned within the cartridge case adjacent to the shoulder of the case and a foot portion positioned adjacent to the breech;

said head portion being threadable and rotatably attached to a first end of a threaded rod and said foot portion being threadably and rotatably attached to a second end of said threaded rod;

means for adjusting an axial distance between a reference surface of said head portion and a reference surface of said foot portion by rotatably translating said head portion and said foot portion in one of either two directions along said threaded rod, the construction being such that the range of adjustment between said head portion and said foot portion enables said gauge to replicate cartridges having the same diameter as that of a rear surface of said foot portion;

said head portion having a rounded front surface which is hemispherically configured to ensure contact between said head portion and the shoulder regardless of the caliber of the corresponding cartridge, the angle of the shoulder and the length of the shoulder contact with said head portion, the distance between said head portion and said foot portion being fixed at each position during construction of a cartridge case which utilizes said gauge.

2. The adjustable cartridge case gauge according to claim 1, further comprising internally threaded bores formed axially within said head portion and said foot portion, fixing screws inserting into said threaded bores for fixing an adjusted position of said head and foot portions relative to said threaded rod.

3. The adjustable cartridge case gauge according to claim 2, said fixing screws further comprising hexagonal head screws.

4. The adjustable cartridge case gauge according to claim 3, further comprising a pair of drivers being recessed within said rear surface of said foot portion and arranged on opposing sides of said associated fixing screw, said drivers being adjustable to provide a limited degree of adjustability to said gauge when installed within the cartridge case.

\* \* \* \* \*